H. F. Willson.
Drag Saw.

Nº 17,719.    Patented June 30, 1857.

UNITED STATES PATENT OFFICE.

H. F. WILLSON, OF ELYRIA, OHIO, ASSIGNOR TO HIMSELF AND HENRY B. WEST.

CROSSCUT-SAWING APPARATUS.

Specification of Letters Patent No. 17,719, dated June 30, 1857.

*To all whom it may concern:*

Be it known that I, HENRY F. WILLSON, of Elyria, in the county of Lorain and State of Ohio, have invented a new and useful Machine for Sawing Wood, Logs, &c.; and I do hereby declare that the following is a full, clear, and exact description of the same, reference being had to the accompanying drawings, and to the letters of reference marked thereon, in which—

Figure 1:
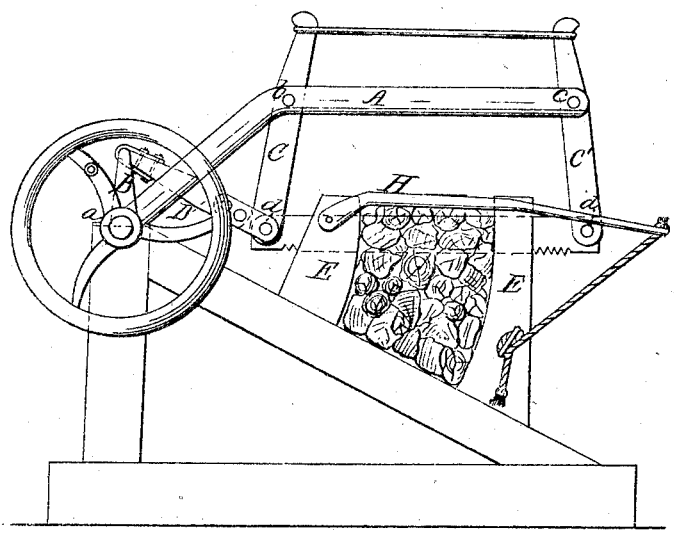
Figure 2:
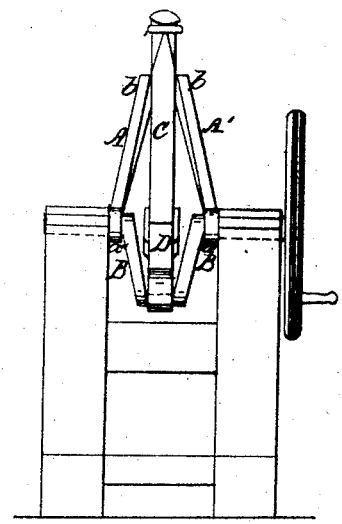
Figure 3:
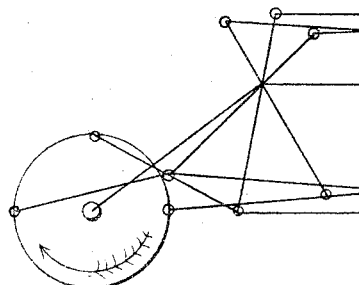
Figure 4:
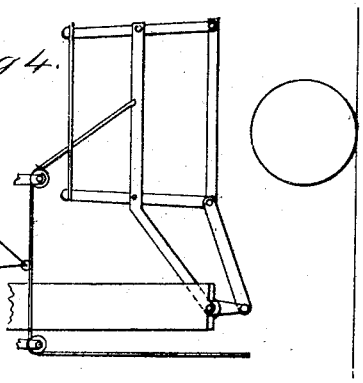

Figure 1 is a side elevation. Fig. 2 is an end elevation. Fig. 3 is a diagram showing the rocking motion of the saw. Fig. 4 is a diagram showing an adjustment for cutting of logs in saw mills, &c.

Like letters refer to like parts in the different figures.

The nature of my invention consists in so arranging and constructing the parts of my machine so that I can strain the saw to any degree of tension and give it a reciprocating and at the same time a rocking motion. Thereby entirely dispensing with the use of guides and their consequent friction and complication, thus rendering it expedient to run a thin plate saw up to any desired motion without danger to the saw. A rocking motion to a reciprocating saw for cross cutting purposes has always been regarded by practical men as the best calculated to cut fast. It has never as yet been attained however only by this simple combination.

To enable others skilled in the art to make and use my invention I will now proceed to describe its construction and operation.

A, A', represent radius bars, which are constructed with an eye which is formed on the inner end, fits on the journals of the driving crank B, as seen at "*a, a*", Fig. 2, so as to allow said crank to turn freely. Said radius bars are so bent as to form an angle as will be seen in the drawings, in Figs. 1 and 2, at "*b, b.*" From this angle said bar runs straight to the end. This bar is also bent sidewise so that the two form a brace and serve to steady the saw frame.

C, C', represent two vibrating bars of wood which are secured between the bars A, A', by means of pins "*b, c,*" in such a manner that they can vibrate freely. At the lower end of these bars the saw is secured by means of pins "*d, d',*" said pins also forming joints which must work freely. Now when the distance between pins "*b, c,*" is equal to that between "*d, d',*" then the motion of the saw during the stroke is parallel to the radius bar, and there is consequently no rocking motion but when "*b, c,*" is less or greater than "*d, d,*" then the saw receives a rocking motion which can be varied according to the variation of the distances between those points. The saw is connected to the crank by connecting rod D. The saw is strained similarly to the ordinary buck saw, as seen in Fig. 1.

E, E', represents two curved uprights, the curve of which is struck from the center of crank B.

H represents a binder for the purpose of securing the wood.

The operation of my machine is as follows: The wood is placed on the machine in the manner seen in Fig. 1, and secured by the binder and the machine is set in motion and the saw is lowered on to the work. After sawing through the saw may be raised up, and thrown back out of the way.

The advantage of the curved uprights for holding the wood is obvious when we consider that the saw, at all times and at every point in the stroke and at whatever angle of elevation the saw is running at draws or thrusts directly in line of the center of crank axle B, so that the tendency of the wood to move about is prevented effectually by coming in contact with the sides of the uprights, and the saw can have a full length of cutting stroke during the whole distance.

There are many different applications or adjustments where this saw will be found invaluable, viz: It may be attached to a portable engine for cutting shingle blocks or saw logs, or adjusted for cutting down trees. Fig. 4 shows an adjustment for cutting sawlogs in mills where the saw may be drawn up clear out of the way.

The advantages of the rocking motion in sawing cross cut, together with straining the saw without loss of power by friction, are too well understood to require comment, further than to say that when a parallel or drag motion is obtained the first teeth cut into the wood while the succeeding teeth all pass through inoperative, while in a rocking motion the first teeth take their cut while the next succeeding teeth are also lowered down so as to be brought in contact with the wood, thus enabling them to each take a separate and independent cut, which will of course insure the removal of a far greater amount of wood.

What I claim as my invention and desire to secure by Letters Patent is—

1. The radius bars in combination with the vibrating bars for the purpose of straining the saw, so as to enable me to give the saw a reciprocating motion without guides.

2. I claim placing pins "$b$, $c$," at a greater, or less distance apart than pins "$d$, $d'$," for the purpose of giving a rocking motion to the saw while reciprocating, said motion to be graduated according to the kind of wood to be sawed, the whole to be arranged constructed and operated in the manner and for the purpose specified.

Signed and sealed in presence of two witnesses.

H. F. WILLSON. [L. S.]

Attest:
  H. S. ROCKWOOD,
  C. E. BASSETT.